Dec. 26, 1950   R. H. CARMEAN   2,535,668
SPEED CHANGER V-BELT PULLEY
Filed Jan. 18, 1946
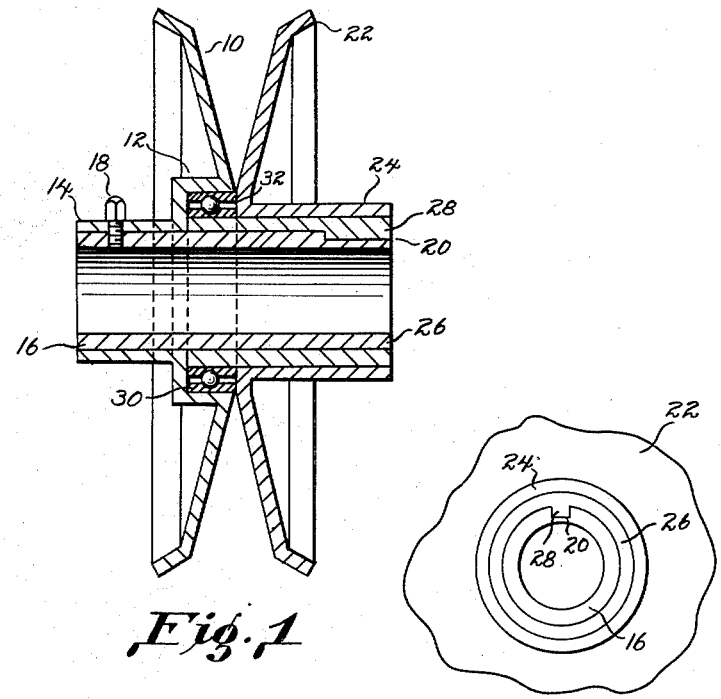
*Fig. 1*
*Fig. 3.*
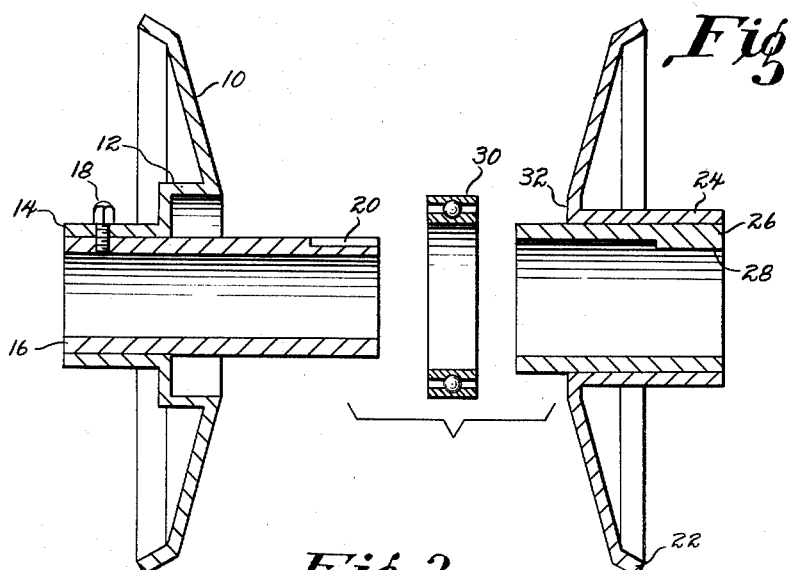
*Fig. 2.*
INVENTOR.
Russell H. Carmean
BY Victor J. Evans & Co.
ATTORNEYS Patented Dec. 26, 1950

2,535,668

UNITED STATES PATENT OFFICE 2,535,668

SPEED CHANGER V-BELT PULLEY

Russell H. Carmean, Chillicothe, Ohio

Application January 18, 1946, Serial No. 641,982

1 Claim. (Cl. 74—230.17)

This invention relates to a speed changer V-belt pulley with clutch, the primary object of which is to provide a pulley which will permit the power shaft and pulley to rotate but will not transmit power to the belt trained thereover until pressure is applied to bring the halves of the pulley into power transmitting position.

By slowly closing the halves of the pulley the speed can be increased after starting at a reduced speed and a belt tightener may be used as desired to get full power when starting.

With the above and other objects and advantages in view the invention consists of the novel details of construction, arrangement and combination of parts more fully hereinafter described, claimed and illustrated in the accompanying drawing in which:

Figure 1 is a section view of an embodiment of the invention;

Figure 2 is a sectional dissembled view thereof and

Figure 3 is an end view thereof showing the pulley broken away.

Referring more in detail to the drawing the reference numeral 10 designates one half of a V-belt pulley having the central circular seat 12 and the sleeve 14 formed integral therewith. The sleeve is adapted to be mounted on a bushing 16 and secured thereto by welding or the like. The sleeve 14 and bushing 16 are adapted to be retained in fixed position on a shaft not shown by means of the set screw 18, and the bushing at the free end thereof is provided with a key way 20 in the outer surface thereof.

The other half 22 of the pulley is provided with a sleeve 24 formed integral therewith and welded on a bushing 26 of sufficient diameter to be received on the bushing 16 and interiorly of the bushing 26 adjacent the end thereof, the key 28 is formed which is adapted to be received in the keyway 20 in the bushing 16.

When the pulley is assembled as shown in Figure 1 the roller bearing 30 is received in the seat 12 and the shoulder 32 formed on the pulley half 22 contacts the bearing 30 as shown in Figure 1.

During the operation of the pulley the halves thereof can be moved to transmit power through the belt trained thereover or they can be moved to permit the belt to engage the bearing 30, causing the drive shaft and pulley to revolve without the transmission of power thus the action of the pulley is similar to that of a clutch permitting the transmission of power as desired at all speeds.

It is believed that the operation and construction of the device will be apparent to those skilled in the art and it is to be understood that changes in the details of construction, arrangement and combination of parts may be resorted to without departing from the spirit of the invention and the scope of the appended claim.

Having thus described the invention what is claimed as new and desired to be secured by Letters Patent is:

A device of the character described, comprising half V-pulleys, sleeves formed on said pulleys, telescoping bushings mounted in said sleeves, said sleeves being welded to their respective bushings, one of said sleeves and its corresponding bushing having tapped alined bores therein, a bolt in said bores to fix said sleeve and said bushing to a shaft, a key in one of said bushings, a complementary keyway in the other of said bushings, said key and keyway engaging to cause the fixed bushing and sleeve to rotate the opposite bushing and sleeve, one of said half pulleys having a seat therein, a roller bearing of greater width than said seat positioned therein and a shoulder on the other half pulley adapted to contact said bearing.

RUSSELL H. CARMEAN.

REFERENCES CITED

The following references are of record in the file of this patent:

UNITED STATES PATENTS

| Number | Name | Date |
|---|---|---|
| 2,207,219 | Heyer | July 9, 1940 |
| 2,259,149 | Cederstrom | Oct. 14, 1941 |

FOREIGN PATENTS

| Number | Country | Date |
|---|---|---|
| 111,761 | Great Britain | Dec. 13, 1917 |